Feb. 23, 1937.  W. G. KIFER  2,071,797

ROLLER BEARING

Filed Nov. 14, 1935

INVENTOR:
Ward G. Kifer

HIS ATTORNEYS.

Patented Feb. 23, 1937

2,071,797

UNITED STATES PATENT OFFICE 2,071,797

ROLLER BEARING

Ward G. Kifer, Canton, Ohio, assignor to The Timken Roller Bearing Company, Canton, Ohio, a corporation of Ohio Application November 14, 1935, Serial No. 49,656

4 Claims. (Cl. 308—214)

My invention relates to roller bearings, particularly roller bearings of large size. According to present day practice, bearings of ordinary size are usually provided with cages that are made of pressed steel that is sprung or bent to permit assembly of the rollers therewith and is then restored or brought to proper shape for service. This practice, however, is not feasible with bearings of large size because the cages must be made so thick that they do not permit of easy springing and, when mechanically distorted to allow assembly of the rollers, they cannot be restored or brought to proper shape without difficulty. The principal object of the present invention is to devise a bearing wherein the rollers are spaced apart by spacing members that act individually instead of being organized into a unitary cage. Another object is to enable the spacing members to take care of radial load in case of breakage of a roller. Another object is to facilitate assembly, inspection, and replacement of parts. The invention consists in the combinations and arrangements of parts hereinafter described and claimed.

Figure 1:
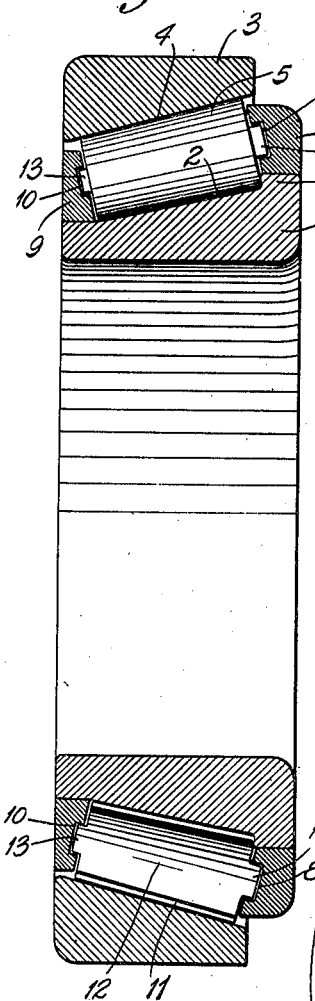
Figure 2:
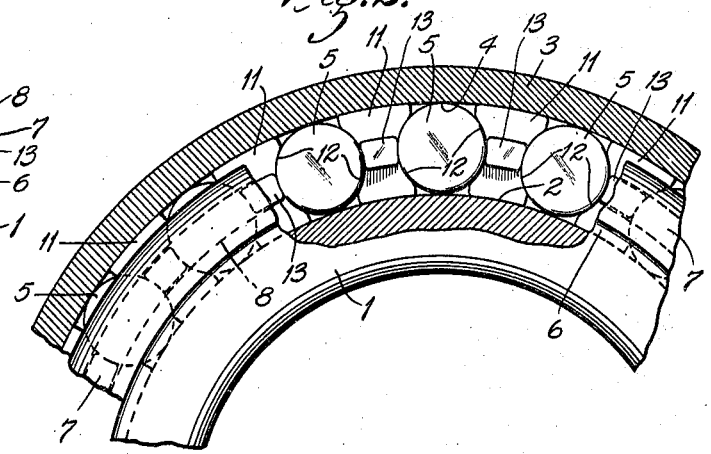
Figure 3:
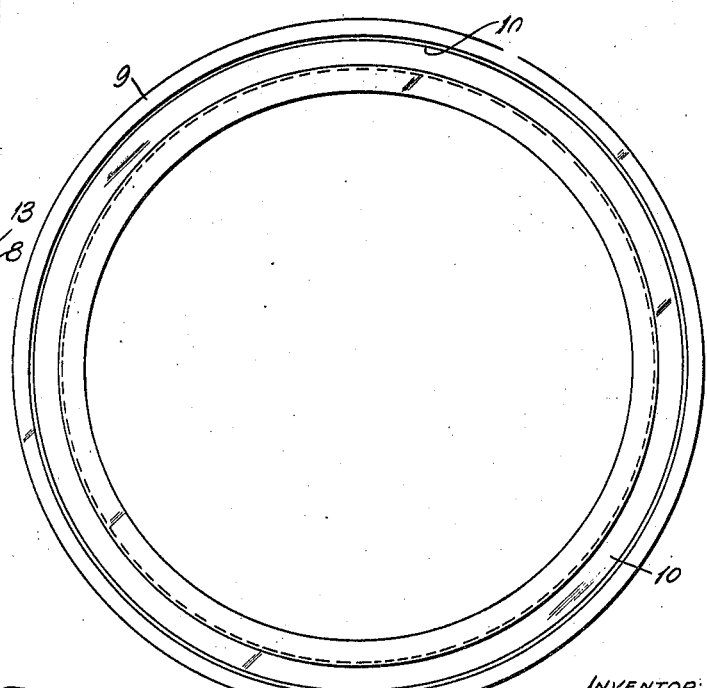
Figure 4:
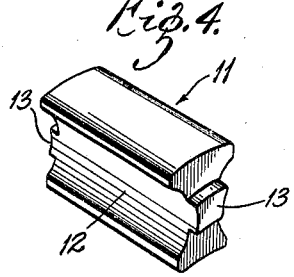
Figure 5:
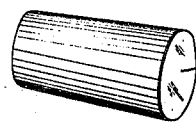

In the accompanying drawing, wherein like reference numerals refer to like parts wherever they occur, Fig. 1 is a longitudinal sectional view of a bearing embodying my invention, Fig. 2 is an end view partly in section of a portion of said bearing, Fig. 3 is a detail view of the smaller end ring, Fig. 4 is a perspective view of a spacing member; and Fig. 5 is a perspective view of a taper roller.

The present bearing comprises a cone or inner bearing member 1 with a conical raceway 2, a cup or outer bearing member 3 with a conical raceway 4, and taper rollers 5 interposed between said inner and outer bearing members. At the large end of the cone is an annular thrust rib 6 whose inner or bearing face is somewhat undercut. The large or thrust end of each taper roller is "flat", that is, it is either a plane surface at right angles to the axis of the roll or is axially recessed so that its endmost points lie in such plane. A roll with such flat end will contact with the undercut thrust rib of the cone at two points spaced apart on opposite sides of the plane common to the axis of the cone and the axis of the roller. At the large end of the cone is a radially extending portion either in the form of a rib integral therewith and with the thrust rib or in the form of a separate annular ring 7 pressed thereon. This ring is provided with an annular groove 8 in its inner face. On the smaller end of the cone is a second rib or ring 9 with an annular groove 10 in its inner face. The distance between the side faces of the annular ribs is slightly greater than the length of the rollers.

Spacing members 11 are located between successive rollers. The spacing member is preferably made of brass or similar material with its side faces 12 concaved conformably to the rolls. The ends of the spacing members have pintles or projections 13 extending endwise into the annular grooves provided therefor in the inner faces of the end rings. The projections are of noncircular shape and have a wide bearing with a sliding fit on the inner and outer walls of the annular grooves 8 and 10, whereby the spacing members can travel freely circumferentially but are prevented from turning about their axes. The body portions of the spacing members are preferably made of slightly less radial dimension than the diameter of the corresponding portion of the roller. By this arrangement, the spacing members travel clear of the roller raceways under normal conditions; but, in case of the breakage of a roller, the spacers adjacent thereto serve to take the radial load which the broken roller should have taken, and thereby prevent distortion of the cup and failure of the bearing as a whole.

The bearing above described is very easy to assemble, as the rollers and spacers may be handled individually until they are locked in position by pressing of the end rings, or the second of them, into position. This mounting of the end rings converts the cone and rollers into a commercial unit that can be handled without danger of disassembly. The bearing is easy to inspect; and if any roller or any spacing member becomes impaired, it is an easy matter to loosen one end ring, replace the defective part, and put back said end ring. This facility of inspection and repair is of very great importance in heavy duty bearings, such as those used on railway cars, rolling mills and the like.

What I claim is:

1. A roller bearing comprising an inner bearing member having a conical raceway and a thrust rib, with its bearing face undercut, at the large end thereof, an outer bearing member having a conical raceway, a series of flat-end taper rollers between said raceways, and spacing members of brass or similar material between said rollers, said inner bearing member having, at the ends of its raceway, relatively longitudinally movable ribs with annular grooves therein, and said spacing members having relatively wide end projections that extend into said grooves, the dimension of said spacing members radially of the bearing being almost equal to the diameter of the rollers whereby the adjacent spacing members take the radial load when the roller between them breaks.

2. A roller bearing comprising an inner bearing member having a conical raceway and a thrust rib, with its bearing face undercut, at the large end thereof, an outer bearing member having a conical raceway, a series of flat-end taper rollers between said raceways, and spacing members of brass or similar material between said rollers, said inner bearing member having, at the ends of its raceway, removably mounted rings with annular grooves therein and said spacing members having end projections that extend into said grooves, the end extensions of said spacing members having wide surfaces next to the walls of the annular grooves to prevent twisting movement of said members.

3. A roller bearing comprising an inner bearing member having a conical raceway and a thrust rib, with its bearing face undercut, at the large end thereof, an outer bearing member having a conical raceway, a series of flat-end taper rollers between said raceways, and spacing members between said rollers, said inner bearing member having at the ends of its raceway separate rings removably pressed thereon, said rings having annular grooves in their inner faces and said spacing members having end projections that fit slidably in said grooves.

4. A roller bearing comprising an inner bearing member having a conical raceway and a thrust rib, with its bearing face undercut, at the large end thereof, an outer bearing member having a conical raceway, a series of flat-end taper rollers between said raceways, and brass-like spacing members between said rollers, said inner bearing member having, at the ends of its raceway, rings with annular grooves therein and one of which is removably mounted, said spacing members having concave sides and end projections that extend into and have a sliding fit in said grooves, the dimension of said spacing members radially of the bearing being almost equal to the diameter of the rollers to take the radial load in case of breakage of a roller, each spacing member having a wide non-circular surface on an end extension next to the wall of a groove to keep said spacing member from turning on its axis.

WARD G. KIFER.